(12) United States Patent
Jeung (10) Patent No.: US 11,121,663 B2
(45) Date of Patent: Sep. 14, 2021

(54) 2-PHASE OUTER RING SWITCHED RELUCTANCE MOTOR FOR LOW-SPEED AND HIGH-FLOW RATE FAN

(71) Applicant: SN INNOVATION CO., LTD., Daejeon (KR)

(72) Inventor: Youngchun Jeung, Cypress, CA (US)

(*) Notice: Subject to any disclaimer, the term of this patent is extended or adjusted under 35 U.S.C. 154(b) by 155 days.

(21) Appl. No.: 16/348,302

(22) PCT Filed: Nov. 15, 2016

(86) PCT No.: PCT/KR2016/013157
§ 371 (c)(1),
(2) Date: May 8, 2019

(87) PCT Pub. No.: WO2018/088602
PCT Pub. Date: May 17, 2018

(65) Prior Publication Data
US 2020/0382038 A1 Dec. 3, 2020

(30) Foreign Application Priority Data
Nov. 11, 2016 (KR) .......................... 10-2016-015632

(51) Int. Cl.
*H02K 5/16* (2006.01)
*H02P 25/098* (2016.01)
(Continued)

(52) U.S. Cl.
CPC ............ *H02P 25/098* (2016.02); *F04D 25/06* (2013.01); *F04D 29/38* (2013.01); *H02K 7/14* (2013.01); *H02K 11/225* (2016.01); *H02K 19/06* (2013.01)

(58) Field of Classification Search
CPC ...... F04D 29/38; H02K 11/225; H02K 19/06; H02K 7/14; H02P 25/098
See application file for complete search history.

(56) References Cited

U.S. PATENT DOCUMENTS

2011/0198521 A1* 8/2011 Hayashi ................ H02P 7/03
251/129.13
2016/0341219 A1* 11/2016 Li ........................ F04D 29/661

FOREIGN PATENT DOCUMENTS

JP          10-337073       12/1998
JP          2012-120342     6/2012
(Continued)

OTHER PUBLICATIONS

English Specification of 10-1644572.
(Continued)

*Primary Examiner* — Muhammad S Islam
(74) *Attorney, Agent, or Firm* — Antonio Ha & U.S. Patent, LLC (57) ABSTRACT

A 2-phase outer ring switched reluctance motor is suitable for use as a low-speed and high-flow rate fan, causes a difference in electrical angle of 180° when two armatures are fitted and coupled along an axial direction at the upper and lower sides thereof one by one and eliminates the difference in electrical angle when two outer ring rotors are fitted and coupled along an axial direction at the upper and lower sides thereof one by one, so as to enable the same to be easily assembled into a 2-phase motor and ensure a firm assembled state, simplifies a structure for detecting an excitation section by modularization in which sensors are provided at each armature and objects to be sensed are provided for each outer ring rotor, and escapes from an unstartable state by using a forward rotation sensor and a reverse rotation sensor.

4 Claims, 8 Drawing Sheets

(51) Int. Cl.
*H02K 7/14* (2006.01)
*F04D 29/38* (2006.01)
*H02K 19/06* (2006.01)
*F04D 25/06* (2006.01)
*H02K 11/225* (2016.01)

(56) References Cited

FOREIGN PATENT DOCUMENTS

| | | |
|---|---|---|
| JP | 2013-188048 | 9/2013 |
| KR | 10-2004-0017721 | 2/2004 |
| KR | 10-1255934 | 4/2013 |
| KR | 10-2016-0009774 | 1/2016 |
| KR | 10-1644572 | 8/2016 |

OTHER PUBLICATIONS

English Specification of 10-1255934.
English Specification of 2013-188048.
English Specification of 2012-120342.
English Specification of 10-2004-0017721.
English Specification of 10-2016-0009774.
English Specification of 10-337073.

\* cited by examiner

2-PHASE OUTER RING SWITCHED RELUCTANCE MOTOR FOR LOW-SPEED AND HIGH-FLOW RATE FAN

TECHNICAL FIELD

The present invention relates to a two-phase outer ring switched reluctance motor which is operated as a two-phase motor to produce continuous torque by arraying two single-phase motor structures each of which consists of an armature and an outer ring rotator along the axial direction, uses sensors for forward rotation and sensors for reverse rotation to escape from the start dead point, allows it appropriate for low speed high volume fans, and has a simplified means to address the start dead point issue.

BACKGROUND ART

A switched reluctance motor (SRM) has a simplified structure with an armature which is wound with a coil and is to be fixed and a rotator which is formed only of an iron core without any excitation means (or permanent magnet).

In such a switched reluctance motor, the time between when the rotor poles start to face the armature poles and when the rotor poles are aligned with the armature poles is defined as a dwell angle within which the armature poles are excited to produce reluctance torque.

As such, switched reluctance motors are driven by reluctance torque produced within the intermittent dwell angle, resulting in severe torque ripples and vibrational noise, and start dead point, and high-speed low-torque characteristics.

Korean Patent No. 10-1644572 issued to the Applicant discloses a motor capable of reducing torque ripples and vibrational noise while avoiding start dead point by damping effects using dual-diameter salient poles. However, this structure does not work enough to achieve low-speed high-torque and its structure to address start dead point issues is complicated.

Meanwhile, Korean Patent No. 10-1255934 discloses a multi-phase high-power motor structure in which a plurality of motors are arrayed along the axial direction but this is complicated, difficult to assemble, and requires a means to sense the position of the rotator in each phase to be added along any one axial direction.

PRIOR DOCUMENTS

Patent Documents (Patent Document 1) KR 10-1644572 BI 12016.07.26.
(Patent Document 2) KR 10-1255934 BI 12013.04.11.

DETAILED DESCRIPTION OF THE INVENTION

Technical Problem

Therefore, the present invention aims to provide a two-phase outer ring switched reluctance motor which has a two-phase structure along the axial direction, is easy to assemble and, after assembled, is durable, has a simplified rotation sensing means for each phase along with a simplified starting configuration and operation, and is configurable in a compact, low-speed low-torque structure.

Technical Solution

To achieve the foregoing objectives, according to the present invention, a two-phase outer ring switched reluctance motor comprises a fixing part (100), the fixing part (100) comprising two armatures (130-1, 130-2) with the same structure, each of the two armatures (130-1, 130-2) including a plurality of armature poles (132) formed on an outer circumferential surface thereof, armature coils (138) wound around the plurality of armature poles to simultaneously produce magnetic flux at the armature poles (132), and sensors (140-1, 141-1, 140-2, 141-2) installed in any one of the armature poles to sense a position of rotation of an outer ring rotator (220-1, 220-2), a shaft hub (120) which allows the armatures (130-1, 130-2) to be firmly fitted over an upper part and lower part, respectively, thereof to fasten the armatures (130-1, 130-2) to make a 180-degree electrical angle difference therebetween, and a fixing center shaft (110) which allows the shaft hub (120) to be firmly fitted thereover and which has a cavity through which a cable is inserted and a through hole through which the cable is connected to the armatures (130-1, 130-2), a rotating part (200), the rotating part (200) comprising two outer ring rotators (220-1, 220-2) with the same structure each of the two outer ring rotators (220-1, 220-2) including a plurality of rotator poles (221) formed on an inner circumferential surface thereof and a sensing target (230-1, 230-2) formed on any one of the rotator poles (221) to fit an arc angle of the rotator pole, and a casing (200) rotatably mounted on the fixing center shaft (110) while surrounding where the two armatures (130-1, 130-2) are installed, exposing at least one of both ends of the fixing center shaft (110) to an outside, allowing the outer ring rotators (220-1, 220-2) to be fitted into an upper and lower part thereof, with the outer ring rotators (220-1, 220-2) rendered consistent with each other in electrical angle, while allowing the two outer ring rotators (220-1, 220-2) to respectively correspond to the two armatures (130-1, 130-2), and a controller (300) detecting a dwell angle for reluctance torque according to a signal from the sensors (140-1, 141-1, 140-2, 141-2) to sense the sensing target (230-1, 230-2) for each of the two armatures (130-1, 130-2) and applying electricity to the armature coils to rotate the rotating part (200) as a two-phase motor.

According to an embodiment of the present invention, the sensors (140-1, 141-1, 140-2, 141-2) include a first sensor (140-1, 140-2) to sense a dwell angle of forward rotation and a second sensor (141-1, 141-2) to sense a dwell angle for reverse rotation. The controller grasps a start dead point according to signals from the first sensor (140-1, 140-2) and the second sensor (141-1, 141-2), and upon the start dead point, applies a predetermined starting pulse of electricity to the armature coils (138) to escape from the start dead point, and then supplies electricity in consistence with the dwell angle.

According to an embodiment of the present invention, the first sensor (140-1, 140-2) and the second sensor (141-1, 141-2) are installed at both ends along a circumferential direction of any one armature pole (132) of each armature (130-1, 130-2). The controller (300) determines that when a signal from the first sensor (140-1, 140-2) and a signal from the second sensor (141-1, 141-2) are simultaneously detected or neither the signal from the first sensor (140-1, 140-2) nor the signal from the second sensor (141-1, 141-2) is detected is the start dead point.

According to an embodiment, upon determining the start dead point, the controller (300) applies a starting pulse of electricity to the unaligned armatures (130-1, 130-2) where both the first sensor (140-1, 140-2) and the second sensor (141-1, 141-2) fail to sense the sensing target.

According to an embodiment of the present invention, the controller (300) supplies electricity during a predetermined time according to a sensor signal for an opposite direction of a direction of operation to escape from the start dead point.

According to an embodiment of the present invention, the sensors (140-1, 141-1, 140-2, 141-2) are mounted on bobbins wrapped on the armature poles before the armature coils are wound.

According to an embodiment of the present invention, a fixing means (117, 118) is provided at, at least, one of both ends of the fixing center shaft (110) to support the motor. A fan blade 240 is fastened to an outer circumferential surface or any one surface of both surfaces in an axial direction of the rotating part 200.

Advantageous Effects

According to the present invention configured as above, the armatures and rotation position sensing means are modularized, and the outer ring rotators and rotation position sensing means are modularized, and then they are fitted together along the axial direction in two rows, thereby forming a two-phase structure. Thus, installation of the rotation position sensing means and assembly of the two-phase structure may be simplified. Further, after assembly, the structure may remain durable. The cable is wired along the shaft and is thus easy to install.

According to the present invention, there are provided both sensors for forward rotation and sensors for reverse rotation. Thus, forward/reverse rotation is rendered possible. The start dead point may be grasped by the sensors, and such control as to escape from the start dead point may be performed. Thus, the configuration for starting may be simplified.

MODE FOR CARRYING OUT THE INVENTION

The terms used herein are defined before describing embodiments of the present invention.

Aligned refers to a state in which the center of an armature pole is in line with the center of a rotor pole so that the surface facing each other with an air gap disposed therebetween has the maximized area. In practice, when the switched reluctance motor is operated so that the center of the rotator pole is positioned within a predetermined range from the center of the armature pole is defined as 'aligned.'

Unaligned refers to a state in which the center of a rotator pole faces the middle point between two adjacent armature poles along the circumferential direction.

Dwell angle refers to an interval where it is possible to produce reluctance torque by applying electricity to the armature coil wound on the armature poles, and this is typically an interval from the time when an armature pole starts to face a rotator pole to the time when the armature pole is aligned with the rotator pole. However, in practical design, the interval may be adjusted to come a little bit ahead and, if the armature pole and the rotator angle each is rendered to have an electrical angle of 180 degrees (half the interval between the respective centers of two adjacent poles along the circumference), the interval between an unaligned angle and an aligned angle substantially becomes the dwell angle.

Start dead point refers to a state in which an armature pole and a rotator pole are aligned or unaligned with each other and no rotation occurs despite applying electricity for producing reluctance torque to the armature coil.

Axial direction includes a direction parallel with a fixed central axis.

Hereinafter, preferred embodiments of the present invention are described with reference to the accompanying drawings to be easily practiced by one of ordinary skill in the art.

Figure 1:
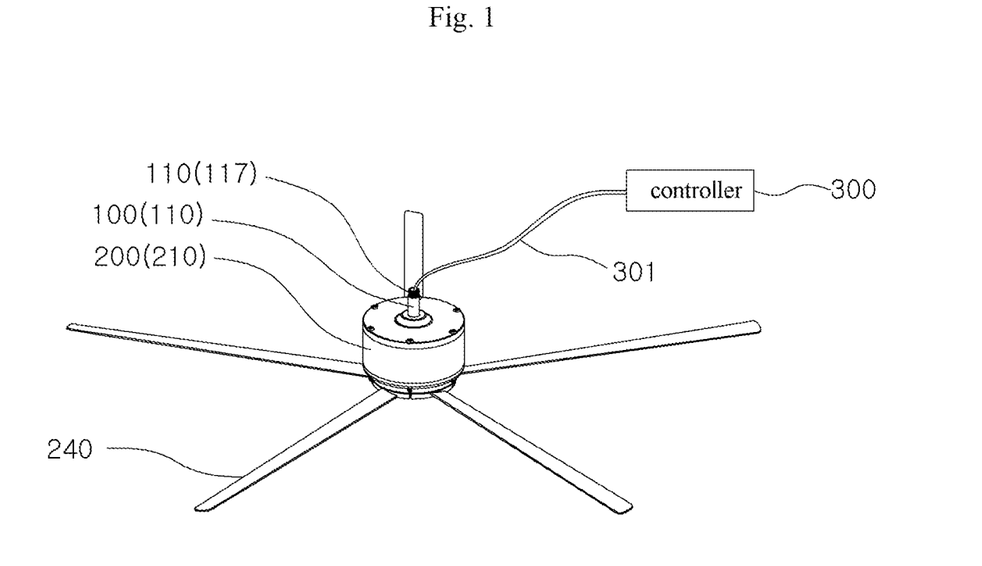
FIG. 1 is a perspective view illustrating a fan using a two-phase outer ring switched reluctance motor according to an embodiment of the present invention.

FIG. 1 is a perspective view of a fan using a two-phase outer ring switched reluctance motor according to an embodiment of the present invention, which illustrates that a fixing means 117 is formed at an end of a fixing center shaft 110 of a fixing part 100 to fix to a place where a motor is installed and fan blades 240 may be installed on a casing 210 of a rotating part 200.

Figure 2:
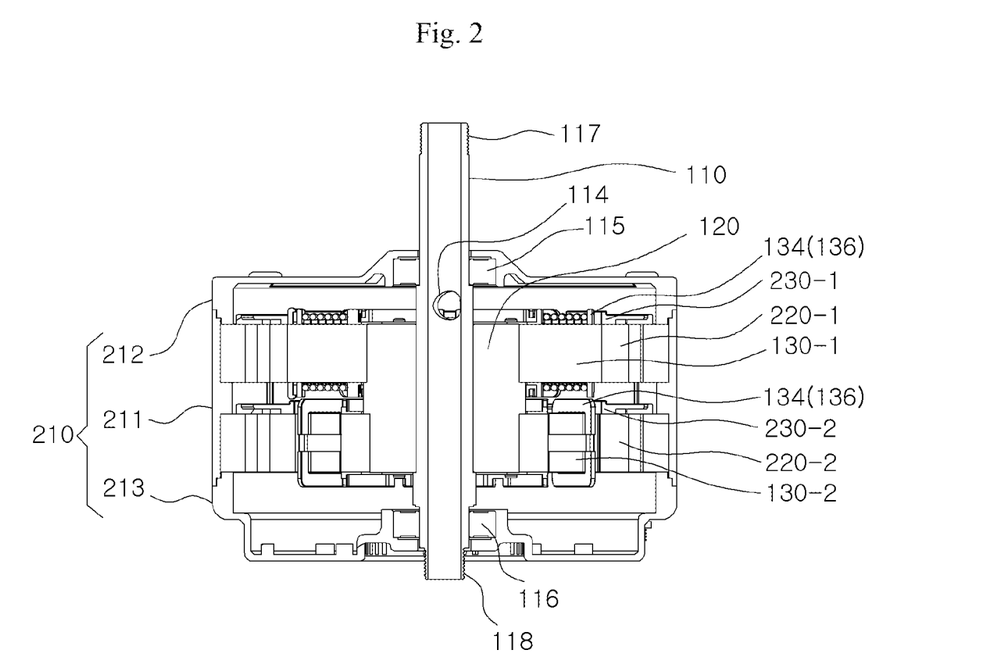
FIG. 2 is a cross-sectional view illustrating a two-phase outer ring switched reluctance motor according to an embodiment of the present invention.

FIG. 2 is a cross-sectional view of a two-phase outer ring switched reluctance motor, illustrating that two armatures 130-1 and 130-2 are fastened to a shaft hub 120 while being spaced apart from each other along the axial direction, the shaft hub 120 is firmly fitted over the fixing center shaft 110, and the casing 210 in which two outer ring rotators 220-1 and 220-2 are fitted along the axial direction to correspond to the two armatures 130-1 and 130-2, respectively is rotatably fixed to the fixing center shaft 110.

Figure 3:
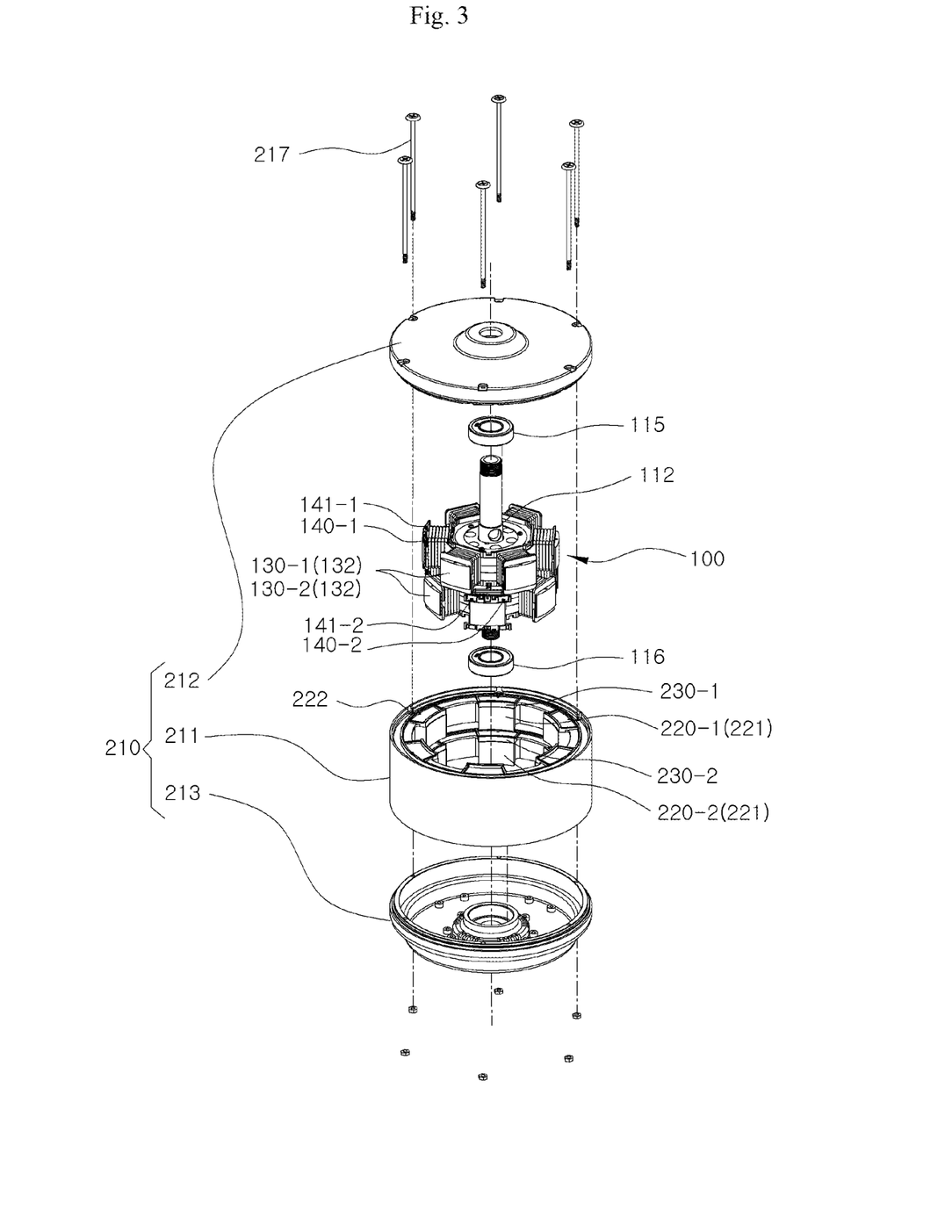
FIG. 3 is an exploded perspective view illustrating a two-phase outer ring switched reluctance motor according to an embodiment of the present invention.

FIG. 3 is an exploded perspective view of a two-phase outer ring switched reluctance motor, illustrating a structure for rotatably mounting the rotating part 200 to the fixing part 100.

Figure 4:
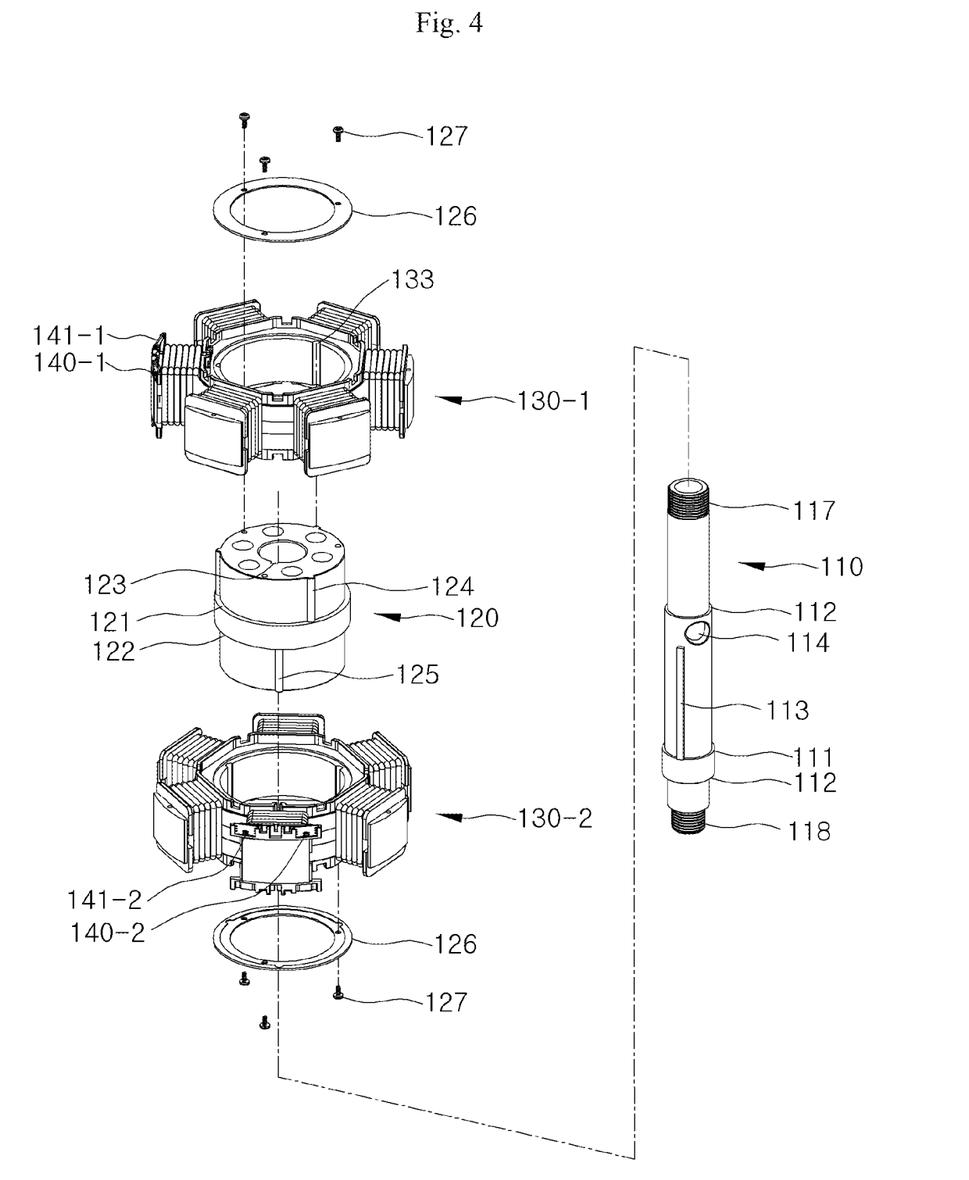
FIG. 4 is an exploded perspective view illustrating a fixing part 100.

FIG. 4 is an exploded perspective view of the fixing part 100, illustrating a structure for installing the two armatures 130-1 and 130-2 along the axial direction.

Figure 5:
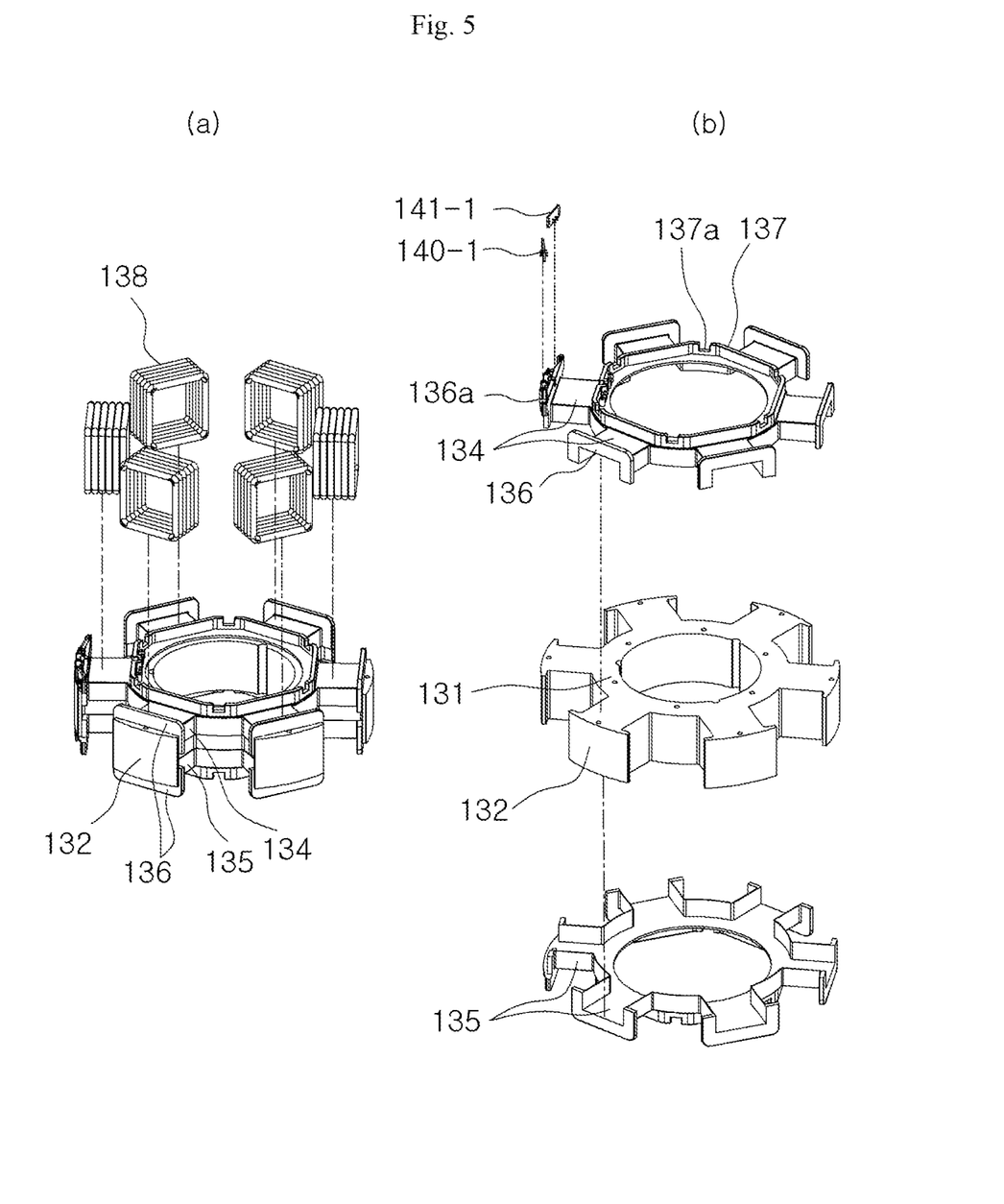
FIG. 5 is an exploded perspective view illustrating an armature 1301- and 130-2.

FIG. 5 is an exploded perspective view of the armatures 130-1 and 130-2, illustrating the structure of the armatures 130-1 and 130-2 to mount sensors.

Figure 6:
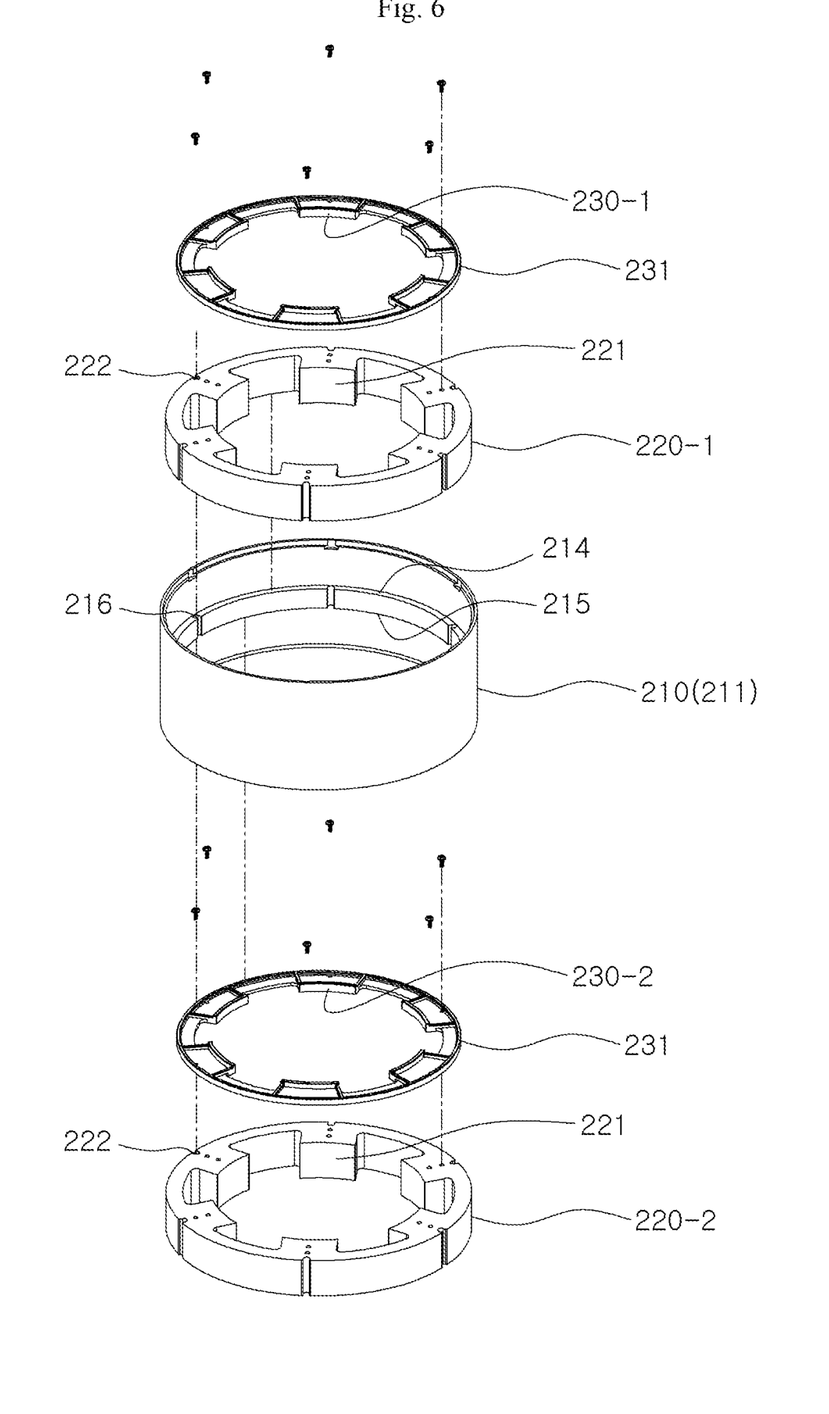
FIG. 6 is an exploded perspective view illustrating an outer ring rotator 220-1 and 220-2 and a sensing target 230 in a cylindrical body 211.

FIG. 6 is a perspective view in which the outer ring rotators 220-1 and 220-2 firmly fitted into the cylindrical body 211 of the casing 210 and sensing targets 230-1 and 230-2 are disassembled, which illustrates a structure for mounting the two outer ring rotators 220-1 and 220-2 where the sensing targets 230-1 and 230-2 are installed.

According to an embodiment of the present invention, a two-phase outer ring switched reluctance motor includes a fixing part 110, a rotating part 200, and a controller 300. In the fixing part 110, two armatures 130-1 and 130-2, which have the same structure, are fixed to a fixing center shaft 110 along the axial direction to make an electrical angle of 180 degrees therebetween. Sensors 140-1, 141-1, 140-2, and 141-2 for sensing a dwell angle are installed on any one of a plurality of armature poles 132 of an armature core 131. The rotating part 200 is rotatably coupled to the fixing center shaft 110. Two outer ring rotators 220-1 and 220-2 with the same structure are firmly fitted along the axial direction to have the same electrical angle therebetween to correspond to the two armatures 130-1 and 130-2, respectively. Sensing targets 230-1 and 230-2 to be sensed by the sensors are installed on the respective poles 221 of the rotators. The controller 300 obtains dwell angles for reluctance torque according to signals from the sensors individually for the two armatures 130-1 and 130-2 and individually applies electricity fitting the obtained dwell angles, thereby rotating the rotating part 200 with the two-phase motor.

Referring to FIG. 4, the fixing part 100 includes a fixing center shaft 110, a shaft hub 120, and two armatures 130-1 and 130-2.

The fixing center shaft 110 is formed of a hollow pipe and has a step 111 and steps 112 on the outer circumference thereof. The step 111 allows the shaft hub 120 fitting over the fixing center shaft 110 from thereabove to be stuck. The steps 112 allow bearings 115 and 116 to be positioned over and below the shaft hub 120 fitted over the fixing center shaft 110.

A key 113 is protruded long along the axial direction on the surface which the shaft hub 120 is fitted over. A through hole 114 is formed in the outer surface between the shaft hub 120 and the upper bearing 115 to communicate with the cavity of the hollow pipe, with the shaft hub 120 and the bearings 115 and 116 fitted over the fixing center shaft 110.

A cable 301 to electrical signal-wise connect the armatures 130-1 and 130-2 fixed to the shaft hub 120 to the controller 300 is inserted from an end of the fixing center shaft 110 through the cavity of the fixing center shaft 110 and is then drawn the through hole 114 to the outside.

Fixing means 117 and 118 are formed along the outer circumference of at least one of the upper and lower ends of the fixing center shaft 110. As shown, the fixing means 117 and 118 may be formed of male screw threads but may be formed in any other structure that may firmly fasten the motor to where the motor is to be installed.

The shaft hub 120 may play a role to fill the space between each armature 130-1 and 130-2 and the fixing center shaft 110 to reduce the volume of the armature core 131. The shaft hub 120 has a key groove 123 which is formed long along the axial direction in the internal circumference of the cavity of the shaft hub 120 to be press-fitted to the key 113 of the fixing center shaft 110 when the shaft hub 120 is fitted over the fixing center shaft 110. The shaft hub 120 may add, e.g., a cotter (not shown) to prevent the shaft hub 120 from escaping off the fixing center shaft 110.

Symmetrical steps 121 and 122 are formed on the outer circumference of the shaft hub 120 by making the diameter at the middle height relatively larger to allow the armatures 130-1 and 130-2 fitted over from above and under the shaft hub 120 to be stuck thereto. A plurality of external elongate protrusions 124 and 125 are formed long from top to bottom on the upper and lower outer circumferential surfaces which are smaller in diameter than the middle.

Here, the external elongate protrusions 124 on the upper outer circumferential surface and the external elongate protrusions 125 on the lower outer circumferential surface are formed to make a 180-degree electrical angle difference along the circumference, so that a 180-degree electrical angle difference is incurred between the armatures 130-1 and 130-2 of the same structure which are fitted over from thereabove and thereunder, respectively. In this case, the electrical angle means a rotational angle when the interval between the centers of the armature poles along the circumference of the armature is 360 degrees.

Referring to FIG. 5, two armatures 130-1 and 130-2 with the same structure are prepared and each includes a hollow armature core 131 with a plurality of armature poles 132 radially and equi-angularly projected from the outer circumference thereof, bobbins 134 and 135 wrapped around the surfaces of the armature poles 132, where armature coils are wound except for the surfaces in the radial directions, and armature coils 138 wound on the bobbins 134 and 135.

Internal elongate grooves 133 are formed long along the axial direction in the internal circumferential surfaces of the armature core 131 of each of the armatures 130-1 and 130-2 to which the external elongate protrusions 124 and 125 are press-fitted when the armature cores 131 are fitted over the shaft hub 120.

According to differences in the positions where the upper external elongate protrusions 124 and the lower external elongate protrusions 125 are formed when the armatures 130-1 and 130-2 with the same structure are fitted over the shaft hub 120 from thereabove and thereunder, 180-degree electrical angle differences occur between the armature poles of the upper armature 130-1 and the armature poles of the lower armature 130-2. Since the armatures 130-1 and 130-2 shown in the drawings are six-pole armatures, a mechanical angle difference of 360/6/2=30° occurs.

As the armature coils 138 are wound around the respective corresponding armature poles 132 of the armatures 130-1 and 130-2 to simultaneously produce magnetic flux through the plurality of armature poles 132 radially arranged, the two armatures 130-1 and 130-2, each of 1s which is an armature of a one-phase motor, produces a 180-degree electric circuit difference therebetween.

According to the present invention, sensors 140-1 and 141-1 or 140-2 and 141-2 to sense the positions of rotation of the outer ring rotator 220-1 or 220-2 in the armature 130-1 or 130-2 are installed on the bobbin 134 wrapped on any one armature pole 132.

The bobbins 134 and 135 are formed separately from each other to wrap both surfaces in the axial direction and both surfaces in the circumferential direction of the armature poles 132 and mounted, thereby protecting the armature coils 138 which are to be wound. The bobbins 134 and 135 have outer flanges 136 which are bent from the ends of the armature poles 132 and extended in the axial direction, thereby preventing the armature coils from escaping off.

According to the present invention, the outer flange 136 of the bobbin 134 wrapped around any one of the plurality of armature poles 132 has a sensor mounting surface 136a for installation of the sensors 140-1 and 141-1 or 140-2, and 141-2. The sensor mounting surface 136a is configured so that the sensors 140-1 and 141-1 or 140-2 and 141-2 are mounted at both ends in the circumferential direction of the armature pole 132. Of the sensors, a first sensor 140-1 or 140-2 is intended for detecting a dwell angle to forward rotate (CW) the outer ring rotator 220-1 or 220-2, and a second sensor 141-1 or 141-2 is intended for detecting a dwell angle to reverse rotate (CCW) the outer ring rotator 220-1 or 220-2.

In each of the armatures 130-1 and 130-2, the bobbins 134 and 135 wrapped around the armature poles 132 include internal barriers 137 which extend in the axial direction to wrap both surfaces in the axial direction of the armature core 131 and the outer circumferential surfaces where no armature poles 132 are formed. The internal barriers 137 partition where the armature coils 138 are wound from the shaft hub 120. A plurality of notches 137 are formed in the internal barriers 137 along the circumferential direction. Cables (or electric wires or signal lines) are connected through the notches 137a to the armature coils 138 and the sensors 140-1 and 141-1 or 140-2 and 141-2.

The so-configured fixing part 100 allows the two armatures 130-1 and 130-2 fixed in the axial direction to have a 180-degree phase difference and is wired through the fixing center shaft 110 placed along the axial direction. Sensors are installed individually in each armature, thus eliminating the need for partitioning the space for installation of sensors from the space for installation of armatures.

Referring to FIGS. 2 and 6, the rotating part 200 includes a casing 210, two outer ring rotators 220-1 and 220-2 with the same structure, and sensing targets 230-1 and 230-2 respectively installed on the outer ring rotators 220-1 and 220-2.

The casing 210 includes a cylindrical body 211 to wrap the outer circumferences of the two armatures 130-1 and 130-2, with a space for installation of the outer ring rotators 220-1 and 220-2 left therebetween, an upper cap 212 to close the top opening of the cylindrical body 211, allow an upper end of the fixing center shaft 110 to pass therethrough to be exposed to the outside and allow the passed-through portion to externally touch the upper bearing 115 to be rotatably coupled, and a lower cap 213 to close the bottom opening of the cylindrical body 211, allow a lower end of the fixing center shaft 110 to pass therethrough to be exposed to the outside, and allow the passed-through portion to externally touch the lower bearing 116 to be rotatably coupled. The casing 210 is rotatably coupled to the fixing center shaft 110 while overall wrapping the two armatures 130 fixed to the shaft hub 120 of one fixing center shaft 110.

The outer ring rotators 220-1 and 220-2 with the same structure are fitted into the cylindrical body 211 from thereabove and thereunder and hung to the internal steps 214 and 215, and the upper cap 212 and the lower cap 213 are fastened to the top and bottom openings of the cylindrical body 211 to thereby fix the outer ring rotators 220-1 and 220-2 to the thereinside.

The casing 210 is assembled in such a manner as to allow long bolts 217 to pass through the upper cap 212 and then connecting grooves 216 between the upper and lower steps 214 and 215 while contacting the internal circumferential surface of the cylindrical body 211 and then through the lower cap 213 then to be screwed with nuts to thereby pressingly fasten the upper cap 212 and the lower cap 213. Since the outer ring rotators 220-1 and 220-2 are brought in tight contact with the internal circumferential surface of the cylindrical body 211, the outer ring rotators 220-1 and 220-2 are provided with long through holes on the circumference thereof to allow the long bolts 217 to pass therethrough and to remain stable and fastened without idling in the casing 210.

The outer ring rotators 220-1 and 220-2 with the same structure, which are fitted into the cylindrical body 211 from thereabove and thereunder have a plurality of rotator poles 221 radially formed along the internal circumferential surface thereof, which are formed at the same intervals as the armature poles 132 formed along the circumferences of the armatures 130-1 and 130-2 and are respectively stuck to the steps 214 and 215 to be spaced apart from each other from top to bottom. The steps 214 and 215 are adjusted to be as high as the steps 121 and 122 of the shaft hub 120, so that the armature poles and the rotator poles may face each other with an air gap disposed therebetween.

Here, the upper and lower outer ring rotators 220-1 and 220-2 have the same structure and, thus, when the outer ring rotators 220-1 and 220-2 are received in the casing 210, the same long bolts 217 are inserted through the long through holes 222, thus allowing the electrical angles to be consistent with each other. In other words, the rotator poles 221 of the upper and lower outer ring rotators 220-1 and 220-2 are rendered to be consistent along the axial direction.

Further, in the upper and lower outer ring rotators 220-1 and 220-2, the sensing targets 230-1 and 230-2 which are rendered to fit the arc angles of the rotator poles 221 are fastened to the upper surface in the axial direction to thereby face the sensors 140-1 and 141-1 or 140-2 and 141-2.

Where the rotating part 200 is rotated, the sensors 140-1 and 141-1 or 140-2 and 141-2 mounted on the upper and lower armatures 130-1 and 130-2 may be able to sense the sensing targets 230-1 and 230-2 fastened on the respective rotator poles 221 of the outer ring rotators 220-1 and 220-2.

For easier manufacture and durability, the sensing target 230-1 or 230-2 to be fastened to the corresponding rotator pole 221 may be integrally formed with the inside of one sensing ring 231, and the sensing ring 231 may be installed in such a manner as to be fastened to the upper surface along the axial direction of the outer ring rotator.

The sensors 140-1 and 141-1 or 140-2 and 141-2 and the sensing targets 230-1 and 230-2 may typically be formed of means to sense a dwell angle in the switched reluctance motor. For example, the sensing targets may be formed of light reflectors while the sensors may be formed of light emitting and light receiving elements, or the sensing targets may be formed of magnets while the sensors may be formed of magnetic field detection hall sensors.

As such, the motor in which the electrical angle difference between the two outer ring rotators 220-1 and 220-2, which have been arranged to respectively correspond to the two armatures 130-1 and 130-2 mounted to have a 180-degree electrical angle difference, is rendered to be the same, and a dwell angle for forward rotation and a dwell angle for reverse rotation for the two outer ring rotators 220-1 and 220-2 are sensed by the two sensors 140-1 and 141-1 or 140-2 and 142-2 may be operated as a two-phase forward/reverse motor under the control of the controller 300.

The controller 300 is described below with reference to FIG. 7.

Figure 7:
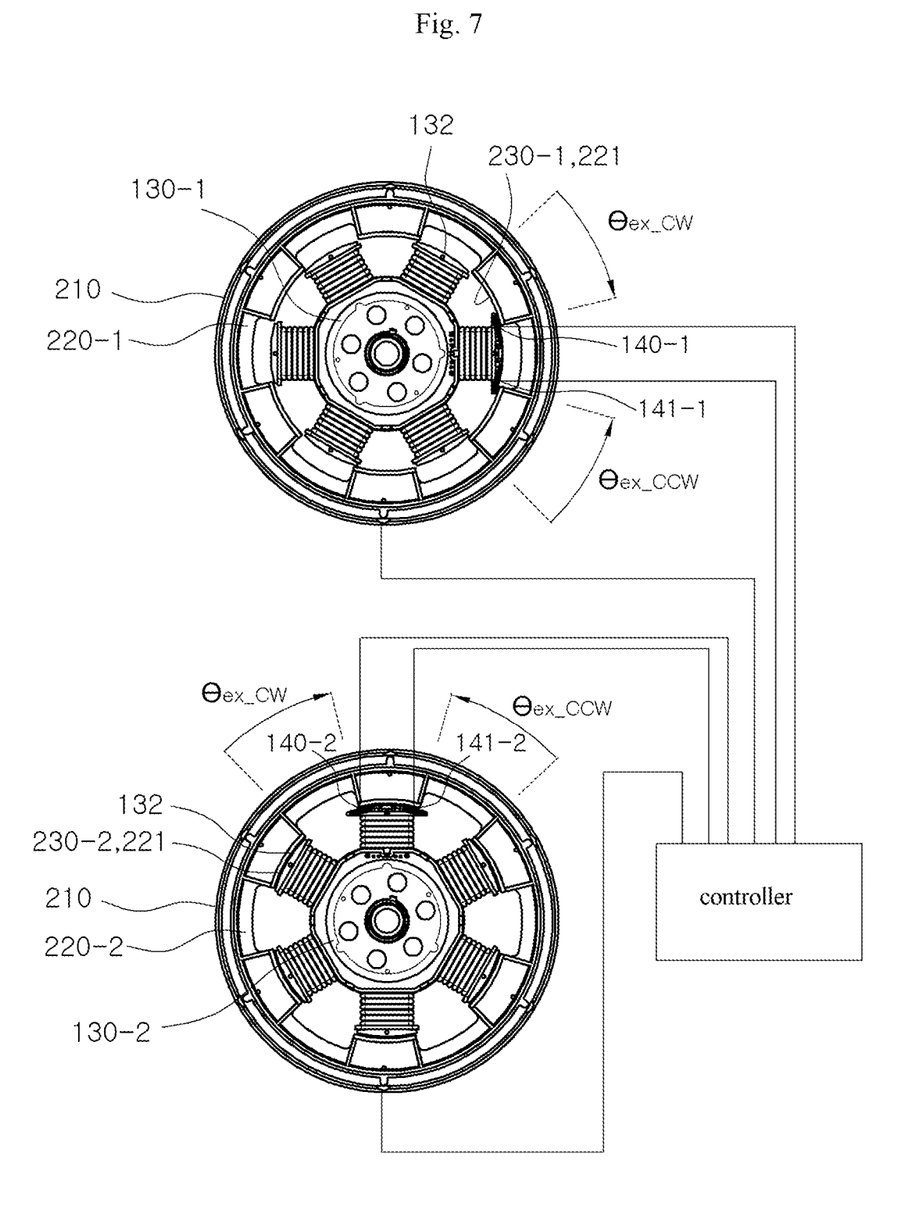
FIG. 7 is a view illustrating a cross section of a portion where an upper armature 130-1 is installed and a cross section of a portion where a lower armature 130-2 is installed.

FIG. 7 illustrates a cross section of where the upper armature 130-1 and the upper outer ring rotator 220-1 are installed and a cross section of where the lower armature 130-2 and the lower outer ring rotator 220-2 are installed. As shown in FIG. 7, the rotor poles of the upper outer ring rotator 220-1 and the rotor poles of the lower outer ring rotator 220-2 are placed in the same electrical angle positions, and the armature poles of the upper armature 130-1 and the armature poles of the lower armature 130-2 exhibit a 180-degree electrical angle difference (a 30-degree mechanical angle for six poles) therebetween.

FIG. 7 illustrates a situation immediately after the lower armature 130-2 departs from the forward rotation dwell angle ($\theta ex\_CW$) and when the upper armature 130-1 enters the forward rotation dwell angle ($\theta ex\_CW$) in the context where the rotating part 200 is forward rotated, substantially showing that continuous torque may be applied to the rotating part 200 by supplying electricity individually to the upper armature 130-1 and the lower armature 130-2 while fitting the dwell angle.

The controller 300 includes switching elements to apply pulse width modulation (PWM) waveforms of electricity to excite the armature poles while fitting the dwell angle per armature 130-1 and 130-2, buttons to select forward rotation operation and reverse rotation operation, and a micro-computer (Micom) to detect the dwell angle for reluctance torque according to signals from the sensors installed in the armatures 130-1 and 130-2, grasp the start dead point, and control the switching elements fitting the direction of operation.

Upon forward rotation of the rotating part 200, the controller 300 detects the dwell angle (θex_CW) for reluctance torque according to each of the sensing signals from the sensor 140-1 for forward rotation installed in the upper armature 130-1 and the sensor 140-2 for forward rotation installed in the lower armature 130-2 and supplies electricity to the armature coils. At this time, the armature poles of the upper armature 130-1 and the armature poles of the lower armature 130-2 have a 180-degree electrical angle difference.

Thus, there occurs a 180-degree phase difference between the dwell angle of the upper armature 130-1 and the dwell angle of the lower armature 130-2, so that the motor, as a two-phase motor, forward-rotates the rotating part 200.

Upon reverse rotation of the rotating part 200, the controller 300 supplies electricity to the armature coils fitting the dwell angle (θex_CCW) detected according to each of the sensing signals from the sensor 141-1 for reverse rotation installed in the upper armature 130-1 and the sensor 141-2 for reverse rotation installed in the lower armature 130-2, so that the motor, as a two-phase motor, rotates the rotating part 200.

Since the armatures 130-1 and 130-2 produce reluctance torque by exciting all the armature poles 132 fitting the dwell angles and cooperating with all the rotator poles 221 of the corresponding outer ring rotators 220-1 and 220-2, the motor of the present invention may produce relatively larger torque than multi-phase motors using a single armature and a single outer ring rotator and, in a case where electricity is supplied to each armature 130-1 and 130-2 all the way in the dwell angle, substantially continuous torque may be generated, reducing torque ripples.

Thus, in adjusting the speed by varying the period of supplying electricity within the dwell angle, the motor of the present invention may reduce noise by continuous torque even at low-speed operation and enable high torque and is thus appropriate for use as a low-speed high-flow fan motor.

Further, the controller 300 grasps the start dead point of the rotating part 200 when starting to rotate the rotating part 200 which used to stop rotation using the sensing values from the sensors 140-1 and 140-2 for forward rotation and the sensors 141-1 and 141-2 for reverse rotation and, if it is at the start dead point, applies predetermined starting pulses of electricity to the armature coils to depart off the start dead point and then supplies electricity fitting the dwell angle for rotation operation.

Since the sensors 140-1 and 140-2 for forward rotation and the sensors 141-1 and 141-2 are installed one-by-one at both ends in the circumferential direction of the armature pole, when the sensors simultaneously detect the sensing targets 230-1 and 230-2 or detects neither the sensing target 230-1 nor the sensing target 230-2 is grasped as a start dead point.

This is described in detail with reference to the 6-pole armatures as shown in the drawings.

For the six-pole structure, the arc angles of the armature poles 132 and the rotator poles 221 may be set to about 30-degree mechanical angles, and the inter-pole intervals along the circumferential direction may be set to about 30-degree mechanical angles. 30-degree angular differences occur between the armature poles of the upper armature and the armature poles of the lower armature.

If the armature poles of the upper armature 130-1 are aligned with the rotator poles of the upper outer ring rotator 220-1, the armature poles of the lower armature 130-2 are unaligned with the rotator poles of the lower outer ring rotator 220-2, so that the rotating part becomes the start dead point and, if not at the start dead point, the rotating part may be rotated by supplying electricity fitting the dwell angle. As shown in Table 1 below, this may be grasped with the values output from the sensors for forward rotation and the sensors for reverse rotation positioned at both ends along the circumferential direction of the armature pole.

TABLE 1

| | | | PHASE | | | | | |
|---|---|---|---|---|---|---|---|---|
| | | | φA upper armature (130-1) upper outer ring rotator (220-1) | | φA lower armature (130-2) lower outer ring rotator (220-2) | | | |
| | | | SENSOR | | | | | |
| | | | sensor 140-1 for forward rotation | sensor 141-1 for reverse rotation | sensor 140-2 for forward rotation | sensor 141-2 for reverse rotation | whether startable or not | target to which starting electricity is to be supplied |
| forward rotation operation (CW) | STATUS | a | 0 | 1 | 1 | 0 | possible | |
| | | b | 1 | 0 | 0 | 1 | possible | |
| | | c | 0 | 0 | 1 | 1 | impossible | φB |
| | | d | 1 | 1 | 0 | 0 | impossible | φA |
| reverse rotation operation (CCW) | STATUS | a | 0 | 1 | 1 | 0 | possible | |
| | | b | 1 | 0 | 0 | 1 | possible | |
| | | c | 0 | 0 | 1 | 1 | impossible | φB |
| | | d | 1 | 1 | 0 | 0 | impossible | φA |

Here, it is assumed that the sensor is configured to output a signal of "0" if the sensing target is sensed and a signal of "1" if the sensing target is not sensed. Electricity is supplied to the armature where the output of the sensor for operation direction is "0" regardless of whether it is forward rotation operation or reverse rotation operation.

In other words, in a case where the output of the sensor 140-1 for forward rotation of the upper memory 130-1 differs from the output of the sensor 141-1 for reverse rotation, the output of the sensor 140-2 for forward rotation of the lower armature 130-2 also differs from the output of the sensor 141-2 for reverse rotation, so that it may be started by supplying electricity to the armature where there is a signal of "0" regardless of whether it is forward rotation or reverse rotation.

However, if the output of the sensor 140-1 for forward rotation of the upper armature 130-1 is the same as the output of the sensor 141-1 of reverse rotation, the output of the sensor 140-1 for forward rotation of the lower armature 130-2 is also the same as the output of the sensor 141-2 for reverse rotation, so that either the upper or lower part is aligned and the other is unaligned, thus resulting in the start dead point and hence rendering it impossible to obtain reluctance torque although electricity is supplied fitting the sensing value of "0" regardless of whether it is forward rotation or reverse rotation.

According to the present invention, in a case where the state in which the outputs of the sensor for forward rotation and the sensor for reverse rotation mounted in the upper or lower armature are identical to each other lasts a predetermined time or longer, the controller 300 grasps the case as the start dead point and supplies starting electricity.

Here, the starting electricity may be electricity which is applied instantaneously as a pulse waveform and is preferably supplied to the armature which stays unaligned.

That is, the starting electricity is supplied to the armature which is in the unaligned state where the values of the sensor for forward rotation and the sensor for reverse rotation of the upper armature 130-1 and the lower armature 130-2 are both "1," thereby producing instantaneous reluctance torque to the closer of the two rotator poles positioned near the armature pole along the circumferential direction and allowing it to depart off the start dead point.

Of course, the supply of starting electricity may allow it to escape off the start dead point even though it is rotated slightly in the opposite direction of the direction of operation regardless of whether it is forward rotation operation or reverse rotation operation and make it start by supplying electricity according to the signals from the sensor which outputs the value of "0" among the sensors for detecting a dwell angle in the direction of operation.

Although the motor is described above as capable of forward and reverse operation, although the motor is configured to rotate in only one direction, it needs to allow it to escape off the start dead point by installing sensors for forward rotation and sensors for reverse rotation.

Meanwhile, another way to escape from the start dead point as adoptable is to supply electricity during a predetermined time according to a sensor signal for the opposite direction of the direction of operation.

Of course, when the start for forward rotation operation is grasped as being at a start dead point, electricity is supplied according to the dwell angle sensed by the sensor for reverse rotation, and electricity is supplied during a predetermined time when it may be rotated by a relatively very tiny angle as compared with the dwell angle.

For start for reverse rotation operation, the operation by the sensor for forward rotation is performed during the above-described predetermined time.

Also in this case, a slight rotation may be caused in the opposite direction of the direction of operation, but it enables escaping off the start dead point. Thus, rotation in the desired direction may be performed later by supplying electricity according to the sensor signals for the direction of operation.

Figure 8:
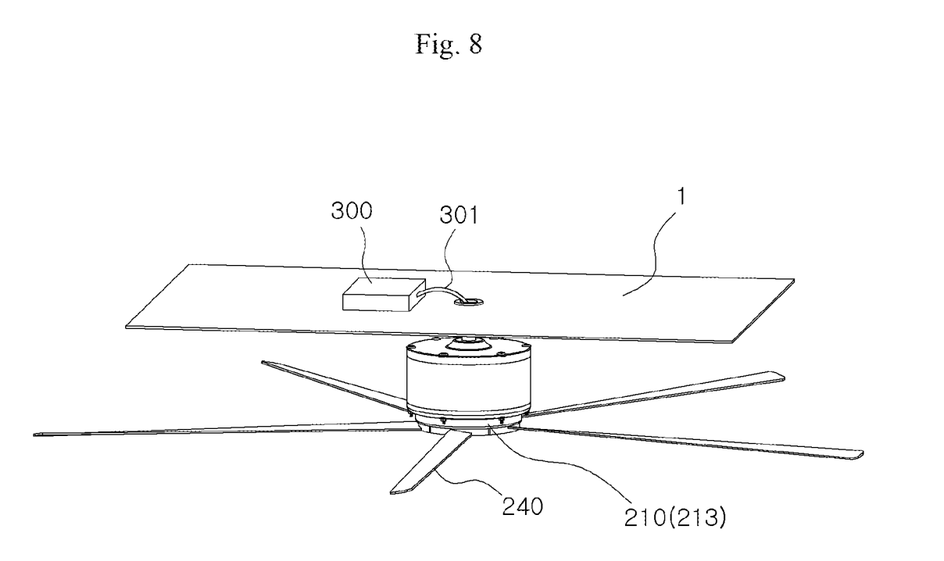
FIG. 8 is a view illustrating a state of installation of a ceiling fan using a two-phase outer ring switched reluctance motor according to an embodiment of the present invention.

The so-configured two-phase outer ring switched reluctance motor of the present invention may be used for a ceiling fan as shown in FIG. 8, wherein the upper end of the fixing center shaft 110 is fastened to the ceiling 1, and fan blades 240 are installed on the lower cap 213 of the casing 210.

Ceiling fans require high volume low speed (HVLS) and silence which may be met by the present invention. Thus, the motor of the present invention may be adequately intended for ceiling fans.

Figure 9:
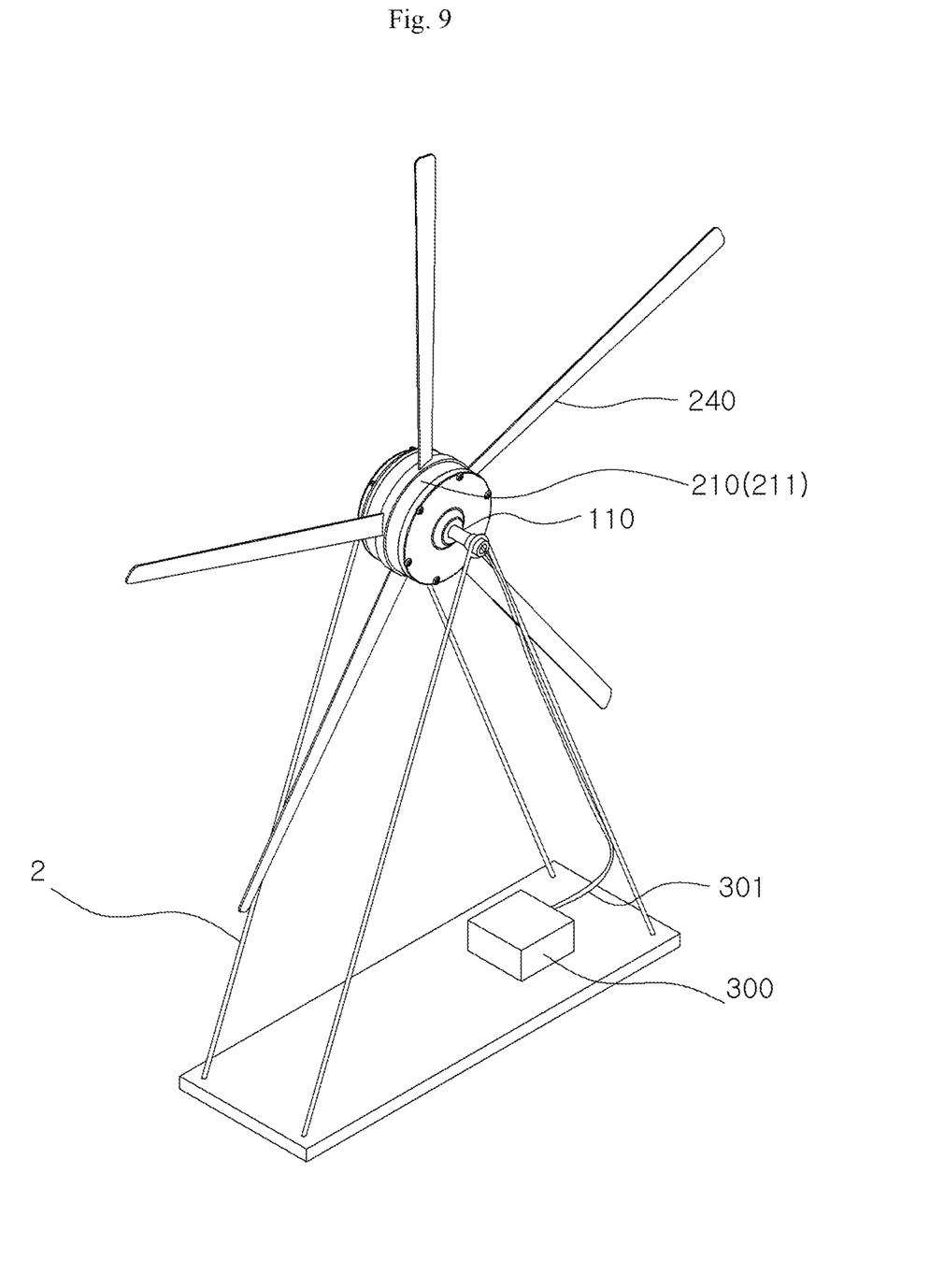
FIG. 9 is a view illustrating a state of installation of another type of fan using a two-phase outer ring switched reluctance motor according to an embodiment of the present invention.

Further, the two-phase outer ring switched reluctance motor of the present invention may be used in a fan as shown in FIG. 9, wherein both ends of the fixing center shaft 110 are fastened to a support 2, and fan blades 240 are fastened to the outer circumference of the cylindrical body 211 of the casing 210.

The controller 300 may be connected to the armatures 130-1 and 130-2 via the cable 301 wired through the fixing center shaft 110, and although the controller 300 is received in a space secured inside the casing 210, electricity may be supplied via the cable 301 wired through the fixing center shaft 110.

DESCRIPTION OF REFERENCE NUMBERS

| | |
|---|---|
| 100: fixing part | |
| 110: fixing center shaft | 111, 112: step 113: key |
| 114: through hole | 115, 116: bearing |
| 117, 118: fixing means | |
| 120: shaft hub 121, 122: step | 123: key groove |
| 124, 125: external long protrusion | 126: fixing ring |
| 127: bolt | 130-1, 130-2: armature |
| 131: armature core | 132: armature pole |
| 133: internal elongate groove | 134, 135: bobbin |
| 136: external flange | 136a: sensor mounting surface |
| 137: internal barrier | 137a: notch |
| 138: armature coil | 140-1, 141-1, 140-2, 141-2: sensor |
| 200: rotating part | 210: casing |
| 211: cylindrical body | 212:upper cap |
| 213: lower cap | 214, 215: step |
| 216: connecting groove | 217: long bolt |
| 220-1, 220-2: outer ring rotator | 221: rotator pole |
| 222: long through hole | 230-1, 230-2: sensing target |
| 231: sensing ring | 240: fan blade |
| 300: controller | 301: cable |

The invention claimed is:

1. A two-phase outer ring switched reluctance motor, comprising:
a fixing part (100), the fixing part (100) comprising two armatures (130-1, 130-2) with the same structure, each of the two armatures (130-1, 130-2) including a plurality of armature poles (132) formed on an outer circumferential surface thereof, armature coils (138) wound around the plurality of armature poles to simultaneously produce magnetic flux at the armature poles (132), and sensors (140-1, 141-1, 140-2, 141-2) installed in any one of the armature poles to sense a position of rotation of an outer ring rotator (220-1, 220-2), a shaft hub (120) which allows the armatures (130-1, 130-2) to be firmly fitted over an upper part and lower part, respectively, thereof to fasten the armatures (130-1, 130-2) to make a 180-degree electrical angle difference therebetween, and a fixing center shaft (110) which allows the shaft hub (120) to be firmly fitted thereover and which has a cavity through which a cable is inserted and a through hole through which the cable is connected to the armatures (130-1, 130-2);

a rotating part (200), the rotating part (200) comprising two outer ring rotators (220-1, 220-2) with the same structure each of the two outer ring rotators (220-1, 220-2) including a plurality of rotator poles (221) formed on an inner circumferential surface thereof and a sensing target (230-1, 230-2) formed on any one of the rotator poles (221) to fit an arc angle of the rotator pole, and a casing (200) rotatably mounted on the fixing center shaft (110) while surrounding where the two armatures (130-1, 130-2) are installed, exposing at least one of both ends of the fixing center shaft (110) to an outside, allowing the outer ring rotators (220-1, 220-2) to be fitted into an upper and lower part thereof, with the outer ring rotators (220-1, 220-2) rendered consistent with each other in electrical angle, while allowing the two outer ring rotators (220-1, 220-2) to respectively correspond to the two armatures (130-1, 130-2); and a controller (300) determining that when a signal from the first sensor (140-1, 140-2) and a signal from the second sensor (141-1, 141-2) to sense sensing targets (230-1, 230-2) are simultaneously detected or neither the signal from the first sensor (140-1, 140-2) nor the signal from the second sensor (141-1, 141-2) is detected is a start dead point, upon determining the start dead point, applying a predetermined starting pulse of electricity to the unaligned armatures (130-1, 130-2) where both the first sensor (140-1, 140-2) and the second sensor (141-1, 141-2) fail to sense the sensing target to escape from the start dead point, and then detecting a dwell angle for reluctance torque according to the signal from the first sensors (140-1, 141-1) and the signal from the second sensors (141-1, 141-2) for each of the two armatures (130-1, 130-2) and applying electricity to the armature coils (138) to rotate the rotating part (200) as a two-phase motor, wherein the sensors (140-1, 141-1, 140-2, 141-2) include a first sensor (140-1, 140-2) to sense a dwell angle of forward rotation and a second sensor (141-1, 141-2) to sense a dwell angle for reverse rotation, wherein the first sensor (140-1, 140-2) and the second sensor (141-1, 141-2) are installed at both ends along a circumferential direction of any one armature pole (132) of each armature (130-1, 130-2).

2. The two-phase outer ring switched reluctance motor of claim 1, wherein upon determining the start dead point, the controller (300) supplies electricity during a predetermined time according to a sensor signal for an opposite direction of a direction of operation to escape from the start dead point.

3. The two-phase outer ring switched reluctance motor of claim 1, wherein the sensors (140-1, 141-1, 140-2, 141-2) are mounted on bobbins wrapped on the armature poles before the armature coils are wound.

4. The two-phase outer ring switched reluctance motor of claim 1, wherein a fixing means (117, 118) is provided at, at least, one, of both ends of the fixing center shaft (110) to support the motor, and wherein a fan blade (240) is fastened to an outer circumferential surface or any one surface of both surfaces in an axial direction of the rotating part (200).

* * * * *